United States Patent
Daum et al.

(10) Patent No.: US 9,419,816 B2
(45) Date of Patent: Aug. 16, 2016

(54) SYSTEM, METHOD, AND COMPUTER SOFTWARE CODE FOR PROVIDING AN AUXILIARY COMMUNICATION PATH WHEN A PRIMARY COMMUNICATION PATH IS UNAVAILABLE

(75) Inventors: Wolfgang Daum, Erie, PA (US); Mark Bradshaw Kraeling, Melbourne, FL (US); Brian D. Lawry, Erie, PA (US); Joseph Forrest Noffsinger, Lees Summit, MI (US)

(73) Assignee: General Electric Company, Schenectady, NY (US)

( * ) Notice: Subject to any disclaimer, the term of this patent is extended or adjusted under 35 U.S.C. 154(b) by 2386 days.

(21) Appl. No.: 12/212,079

(22) Filed: Sep. 17, 2008

(65) Prior Publication Data
US 2010/0029209 A1 Feb. 4, 2010

(51) Int. Cl.
*H04B 7/00* (2006.01)
*H04L 12/40* (2006.01)
*B61L 15/00* (2006.01)
*H04L 29/14* (2006.01)

(52) U.S. Cl.
CPC ....... *H04L 12/40189* (2013.01); *B61L 15/0027* (2013.01); *H04L 69/40* (2013.01); *H04L 2012/40293* (2013.01)

(58) Field of Classification Search
USPC .......................................................... 398/5
See application file for complete search history.

(56) References Cited

U.S. PATENT DOCUMENTS

| | | | |
|---|---|---|---|
| 5,404,465 A | 4/1995 | Novakovich et al. | |
| 5,681,015 A * | 10/1997 | Kull | 246/187 C |
| 6,095,618 A | 8/2000 | Heneka et al. | |
| 6,401,015 B1 * | 6/2002 | Stewart et al. | 701/19 |
| 7,463,732 B1 * | 12/2008 | Hiscock et al. | 379/399.02 |
| 7,808,892 B1 * | 10/2010 | Babcock et al. | 370/219 |
| 2002/0172186 A1 * | 11/2002 | Larsson | 370/349 |
| 2006/0085103 A1 * | 4/2006 | Smith et al. | 701/19 |
| 2007/0190998 A1 * | 8/2007 | Tanaka et al. | 455/423 |

OTHER PUBLICATIONS

Schultes G, Bussysteme Des IntercityExpress\the bus systems of the IntercityExpress. Zeitschrift Fur Eisenbahnwesen Und Verkehrstechnik—DieEisenbahntecnik—Glasers Annalen, Nov. 1, 1992, pp. 438-442, vol. 116, No. 11/12, Georg Siemens Verlagsbuchhandlung, Berlin, DE.
International Search Report issued in connection with corresponding PCT Application No. PCT/US2009/049541 on Oct. 13, 2009.
Written Opinion issued in connection with corresponding PCT Application No. PCT/US2009/049541 on Oct. 13, 2009.

* cited by examiner

*Primary Examiner* — Fanghwa Wang
(74) *Attorney, Agent, or Firm* — GE Global Patent Operation (57) ABSTRACT

A method for communicating on a train that has at least two locomotives, the method including determining when a primary communication path ceases to be available for a specific subsystem of the train, identifying at least one auxiliary communication path to transmit information for the specific subsystem, configuring a message for the specific subsystem which complies with a message format of the at least one auxiliary communication path, and transmitting the message on the at least one auxiliary communication path. A system and a computer software code are further disclosed for providing a communication system for a powered system.

20 Claims, 3 Drawing Sheets

SYSTEM, METHOD, AND COMPUTER SOFTWARE CODE FOR PROVIDING AN AUXILIARY COMMUNICATION PATH WHEN A PRIMARY COMMUNICATION PATH IS UNAVAILABLE

CROSS-REFERENCE TO RELATED APPLICATIONS

The present application claims priority to U.S. Provisional Application No. 61/086,144 filed Aug. 4, 2008.

BACKGROUND OF THE INVENTION

This invention relates generally to providing communications through power systems that are connected or coupled and, more particularly, to a system, method, and computer software code for providing communication paths when a primary communication path is inoperable and/or unavailable for powered systems that are connected or coupled.

Some powered systems (such as, but not limited to, off-highway vehicles, marine diesel powered propulsion plants, stationary diesel powered system, agricultural vehicles, and trains or other rail vehicle systems) are powered by one or more diesel power units, or diesel-fueled power generating units. With respect to rail vehicle systems, a diesel power unit is usually a part of at least one locomotive powered by at least one diesel internal combustion engine, and with the locomotive being part of a train that further includes a plurality of rail cars, such as freight cars. Locomotives are complex systems with numerous subsystems, with each subsystem being interdependent on other subsystems.

Usually more than one locomotive is provided in a train, wherein the locomotives are referred to as a locomotive "consist," e.g., the locomotive consist is a group of locomotives that operate together in operating a train. To function together, each locomotive must be able to communicate with the other locomotives. More specifically, depending on its purpose, the numerous subsystems on each locomotive must also be able to communicate with like subsystems on the other locomotives.

Figure 1:
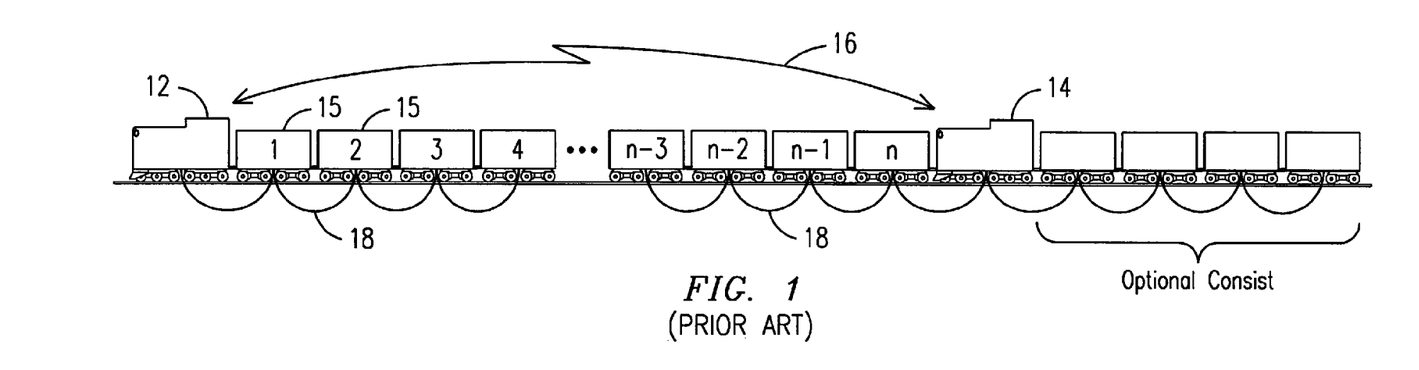
FIG. 1 depicts a block diagram illustrating a prior art embodiment of communication paths through a train.

FIG. 1 depicts a block diagram illustrating a prior art embodiment of communication paths through a train. Certain subsystems on the train are required to communicate through the train. As illustrated, a lead locomotive consist 12 and a remote locomotive consist 14 will have to communicate information such as, but not limited to, braking commands and other braking-related information between both consists 12, 14. This communication may be done either using a wireless communication path 16 and/or a wired communication path 18. As illustrated, a wired communication path 18 may pass through railcars 15 that separate locomotive consists 12, 14. Communication networks 16, 18 for specific subsystems are usually unique for these specific subsystems. Therefore, if a specific subsystem's communication path fails, a redundancy path is not available. Not having an available redundant path may result in the train losing performance capabilities to an extent of being non-functional.

Owners and operators of powered systems that link with like powered systems (such as, but not limited to, locomotives within a train) would benefit from a system, method, and computer software code that provides a protocol that permits information, or data, for a specific subsystem to reach its destination using another available communication path when its primary communication path is unable to complete the communication task. Such a protocol would allow for selecting another communication path to ensure that the powered system can complete its mission within predefined mission parameters.

BRIEF DESCRIPTION OF THE INVENTION

Embodiments of the present invention relate to a system, method, and computer software code for ensuring communication paths exist when a primary communication path is inoperable. In one aspect, the method includes providing at least one auxiliary communication path for a specific subsystem onboard a train that has at least two locomotives when a primary communication path for the specific subsystem ceases to be available. The method includes determining when a primary communication path ceases to be available for a specific subsystem. At least one auxiliary communication path is identified to transmit information for the specific subsystem. A message for the specific subsystem is configured which complies with a message format for the at least one auxiliary communication path. The message is transmitted on the at least one auxiliary communication path.

In another embodiment, the computer software code is storable on a computer readable media and is executed with a processor designated for providing at least one auxiliary communication path for a specific subsystem onboard a train having at least two locomotives when a primary communication path for the specific subsystem ceases to be available. A computer software module is provided for determining when a primary communication path ceases to be available for a specific subsystem. (As should be appreciated, for this software module and the others described herein, the stated function(s) is typically carried out the software module is executed with the processor.) Another computer software module is provided for identifying at least one auxiliary communication path to transmit information for the specific subsystem. Yet another computer software module is provided for configuring a message for the specific subsystem which complies with a message format for the at least one auxiliary communication. Also disclosed is a computer software module for transmitting the message on the at least one auxiliary communication path.

In another embodiment, a communication system is disclosed for a powered system. The system has a plurality of communication paths on the powered system. A processor is configured to determine whether a primary communication path is available for use by at least one specific subsystem of the powered system. The processor is further configured to identify an auxiliary communication path, configure a message of the specific subsystem for delivery with the auxiliary communication path when the primary communication path is not available, said message originally meant to be delivered with the primary communication path, and transmit the message with the auxiliary communication path.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, exemplary embodiments of the invention will be described and explained with additional specificity and detail through the use of the accompanying drawings in which.

DETAILED DESCRIPTION OF THE INVENTION

Reference will be made below in detail to exemplary embodiments of the invention, examples of which are illustrated in the accompanying drawings. Wherever possible, the same reference numerals used throughout the drawings refer to the same or like parts. As disclosed below, multiple version of a same element may be disclosed. Likewise, with respect to other elements, a singular version is disclosed. Neither multiple versions disclosed nor a singular version disclosed shall be considered limiting. Specifically though multiple versions are disclosed a singular version may be utilized. Likewise, where a singular version is disclosed, multiple versions may be utilized.

Though exemplary embodiments of the present invention are described with respect to rail vehicles, or railway transportation systems, specifically trains and locomotives, exemplary embodiments of the invention are also applicable for use with other powered systems, such as but not limited to marine vehicles, stationary units, off-highway vehicles, and other vehicles such as agricultural vehicles, each which may use at least one engine and where at least two of these powered systems are connected, or coupled together, either directly or through an intermediate vehicle or other unit, collectively working together to accomplish a specified mission. Towards this end, when discussing a specified mission, this includes a task or requirement to be performed by the powered system. Therefore, with respect to railway vehicle, agricultural vehicle, or off-highway vehicle applications, this may refer to the movement of the collective powered system from a present location to a destination. In the case of stationary applications, such as but not limited to a stationary power generating station or network of power generating stations, a specified mission may refer to an amount of wattage (e.g., MW/hr) or other parameter or requirement to be satisfied by the powered system.

Though diesel powered systems are readily recognized when discussing trains or locomotives, those skilled in the art will readily recognize that embodiments of the invention may also be utilized with non-diesel powered systems, such as but not limited to natural gas powered systems, bio-diesel powered systems, etc. Furthermore the individual powered system may include multiple engines, other power sources, and/or additional power sources, such as, but not limited to, battery sources, voltage sources (such as but not limited to capacitors), chemical sources, pressure based sources (such as but not limited to spring and/or hydraulic expansion), electrical current sources (such as but not limited to inductors), inertial sources (such as but not limited to flywheel devices), gravitational-based power sources, and/or thermal-based power sources.

Exemplary embodiments of the invention solve problems in the art by providing a system, method, and computer implemented method, such as a computer software code or computer readable media, for ensuring at least one auxiliary communication path exists when a primary communication path is inoperable, or unavailable. With respect to locomotives, exemplary embodiments of the present invention are also operable when the locomotive consist is in distributed power operations.

Throughout this document the term "locomotive consist" is used. As used herein, a locomotive consist may be described as having one or more locomotives in succession, connected together so as to provide motoring and/or braking capability. In many cases, the locomotives are connected together where no train cars are in between the locomotives. The train can have more than one locomotive consists in its composition. Specifically, there can be a lead consist and one or more remote consists, such as midway in the line of cars and another remote consist at the end of the train. Each locomotive consist may have a first locomotive and trail locomotive(s). Though a first locomotive is usually viewed as the lead locomotive, those skilled in the art will readily recognize that the first locomotive in a multi locomotive consist may be physically located in a physically trailing position. Though a locomotive consist is usually viewed as involving successive locomotives, those skilled in the art will readily recognize that a consist group of locomotives may also be recognized as a consist even when one or more rail cars separate the locomotives, such as when the locomotive consist is configured for distributed power operation, wherein throttle and braking commands are relayed from the lead locomotive to the remote trains by a radio link or physical cable. Towards this end, the term locomotive consist should not be considered a limiting factor when discussing multiple locomotives within the same train.

As disclosed herein, the idea of a consist may also be applicable when referring to other types of powered systems including, but not limited to, marine vessels, off-highway vehicles, agricultural vehicles, and/or stationary power plants, that operate together so as to provide motoring, power generation, and/or braking capability. Therefore, even though the term locomotive consist is used herein in regards to certain illustrative embodiments, this term may also apply to other powered systems. Similarly, sub-consists may exist. For example, the powered system may have more than one power generating unit. For example, a power plant may have more than one diesel electric power unit where optimization may be at the sub-consist level. Likewise, a locomotive may have more than one diesel power unit.

Persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk, computer readable media, or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Broadly speaking, a technical effect is for ensuring at least one communication path exists when a primary communication path is inoperable, or unavailable. To facilitate an understanding of the exemplary embodiments of the invention, it is described hereinafter with reference to specific implementations thereof. Exemplary embodiments of the invention may be described in the general context of computer-executable instructions, such as program modules, being executed by any device, such as but not limited to a computer, designed to accept data, perform prescribed mathematical and/or logical operations usually at high speed, where results of such operations may or may not be displayed. Generally, program modules include routines, programs, objects, components, data structures, etc. that perform particular tasks or implement particular abstract data types. For example, the software programs that underlie exemplary embodiments of the invention can be coded in different programming languages, for use with different devices, or platforms. In the description that follows, examples of the invention may be described in the context of a web portal that employs a web browser. It will be appreciated, however, that the principles that underlie exemplary embodiments of the invention can be implemented with other types of computer software technologies as well.

Moreover, those skilled in the art will appreciate that exemplary embodiments of the invention may be practiced with other computer system configurations, including hand-held devices, multiprocessor systems, microprocessor-based or programmable consumer electronics, minicomputers, mainframe computers, and the like. Exemplary embodiments of the invention may also be practiced in distributed computing environments where tasks are performed by remote processing devices that are linked through at least one communications network. In a distributed computing environment, program modules may be located in both local and remote computer storage media including memory storage devices.

Referring now to the drawings, embodiments of the present invention will be described. Exemplary embodiments of the invention can be implemented in numerous ways, including as a system (including a computer processing system), a method (including a computerized method), an apparatus, a computer readable medium, a computer program product, a graphical user interface, including a web portal, or a data structure tangibly fixed in a computer readable memory. Several embodiments of the invention are discussed below.

Figure 2:
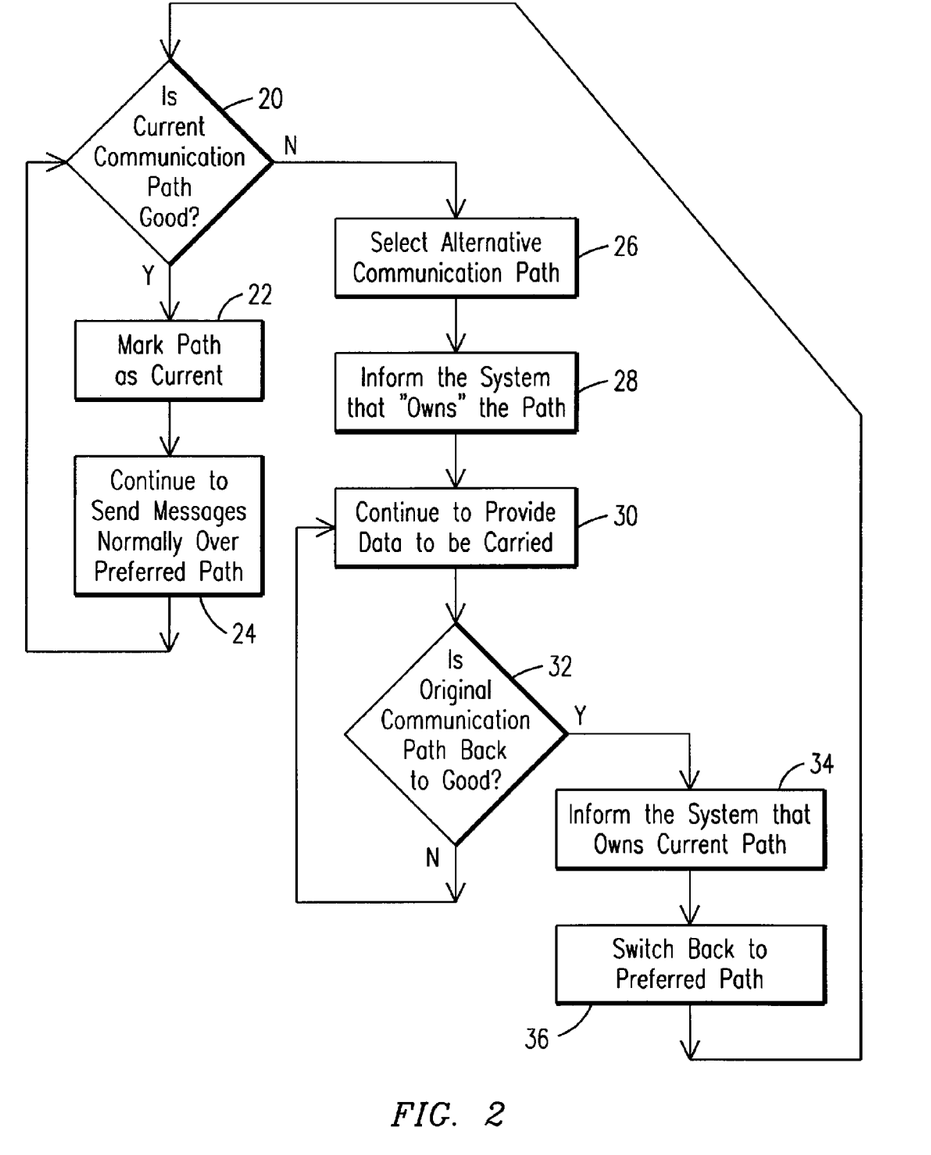
FIG. 2 depicts a flowchart illustrating an exemplary embodiment of a method for ensuring communication paths exist when a primary communication path is inoperable.

FIG. 2 depicts a flowchart illustrating an exemplary embodiment for ensuring communication paths exist when a primary communication path is inoperable. A decision gate, at 20, is provided to determine whether a current, or primary, communication path is working for a first subsystem. (The primary or current path is also arbitrarily referred to as the "preferred" path in FIG. 2.) If the path is working, the path is marked as current, at 22, and communications, or messages, are sent as they would normally be sent through the current, or primary, communication path, at 24. When the primary communication path ceases to be operable, an alternative, or auxiliary communication path is selected, at 26. A second subsystem that the auxiliary communication path is associated with (i.e., the second subsystem "owns" the auxiliary communication path) is notified that its communication path is needed to provide a communication path for another subsystem, at 28, more specifically the first subsystem. Messages, or communications, are carried for the first subsystem on the auxiliary communication path, at 30. A decision gate, at 32, is provided to determine when the primary communication path is again available. As long as the primary communication path is not available, the first subsystem may continue to use the auxiliary communication path. When the primary communication path is again available, the second subsystem is notified that use of its communication path, at 34, which is the auxiliary communication path, is no longer required and a switch, or transition, is made back to the primary communication path, at 36.

As illustrated above, at least one alternate or auxiliary communication path to route data through pre-existing communication paths is provided. This is accomplished using an algorithm, storable decision processes, and/or communication protocol to ensure that data required for the first subsystem reaches its destination. In an exemplary embodiment, when an auxiliary communication path is used, reduced information, or data, may be transmitted where reduced functionality may result. For example, suppose that the first subsystem has a capability to communicate operational conditions as well as locator or positioning information, or data, through the train. However, for the first subsystem and similar subsystems in communication with the first subsystem, the only required information is associated with the operational conditions. Instead of possibly limiting the full functionality of the auxiliary communication path by trying to communicate information that exceeds a bandwidth of the auxiliary communication path, which is primarily responsible for the second subsystem's communication requirements, the locator information may not be transmitted. Therefore, for messages that are being transmitted over an auxiliary communication path, the message may be restructured to be in compliance with the bandwidth of the auxiliary communication path.

Exemplary embodiments of the invention may also be utilized even where subsystems may already have multiple communication paths available to transfer data. For example, with respect to a train, a dynamic brake modem may collect information on a trainline network. The information is then forwarded to a distributed power box, which in turn delivers the information, usually over a radio frequency (RF) link, to a lead locomotive. The lead locomotive then forwards the information, such as via a RS422 link, to an onboard control system, which then returns the information to the dynamic brake modem via an Ethernet communication path. Therefore, exemplary embodiments of the invention may be used to select an auxiliary communication path should any of these communication paths fail or become inoperable.

Several terms are used herein to describe when a communication path is unable to provide communication therethrough. Such terms include, but are not limited to, fail, inoperable, unavailable, communication loss, etc. These terms are not limiting since they may pertain to not having sufficient bandwidth to effect communication, improper message format, a hardware failure, and/or a software failure. Similarly, several terms are used herein to describe when the communication path is able to provide communication therethrough. Such terms include, but are not limited to, work, operable, available, and the like.

Figure 3:
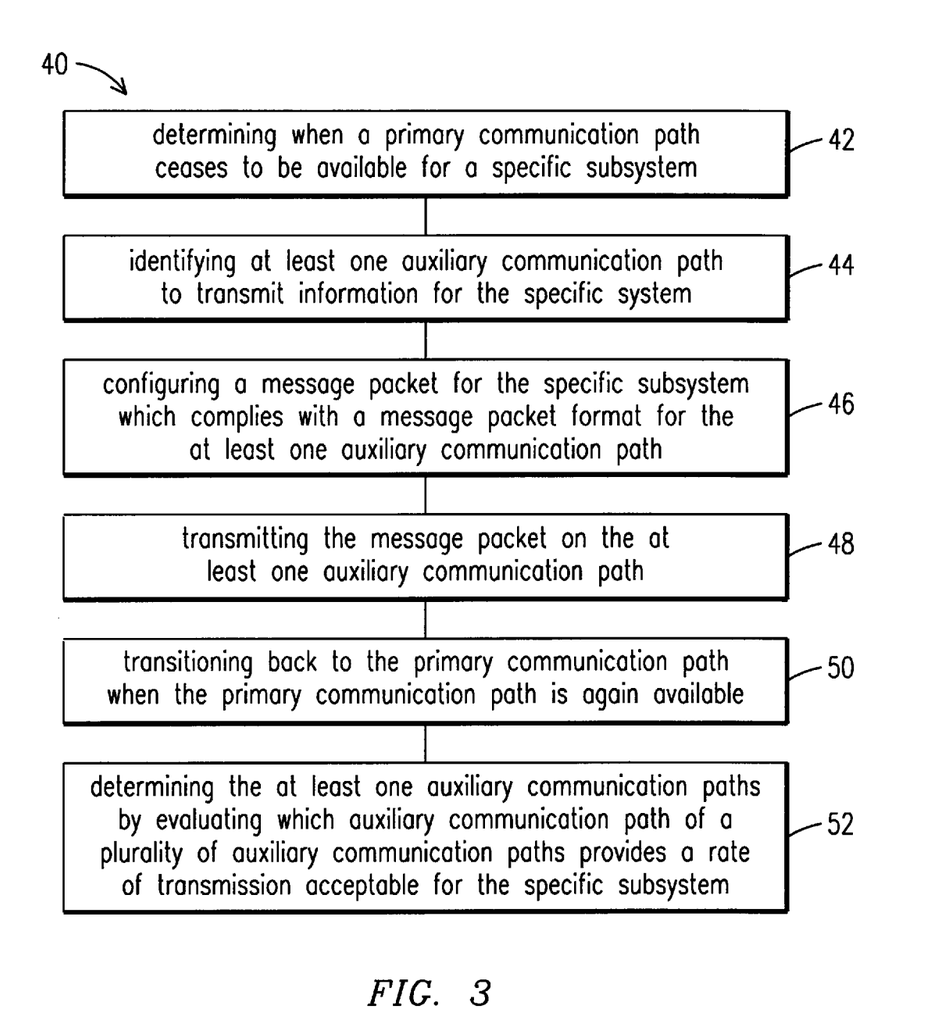
FIG. 3 depicts another flowchart illustrating another exemplary embodiment of a method for ensuring communication paths exist when a primary communication path is inoperable.

FIG. 3 depicts another flowchart illustrating an exemplary embodiment of a method for ensuring communication paths exist when a primary communication path is inoperable. As illustrated in the flowchart 40, a determination is made when a primary communication path for a specific subsystem ceases to be available, at 42. At least one auxiliary communication path to transmit information for the specific subsystem is identified, at 44. The message for the specific subsystem (e.g., a message packet) is configured to comply with a message format for the auxiliary communication path, at 46. Configuring the message may include, but is not limited to restructuring the message to be compliant to a bandwidth of the auxiliary communication path, and/or removing non-vital information from the message so that the message is compliant with the message format for the at least one auxiliary communication path. "Non-vital information" means information that is not critical to operating the powered system. The message is transmitted on the auxiliary communication path, at 48. When the primary communication path is again available, the communication is transitioned back to the primary communication path, at 50. Before selecting an auxiliary communication path, a determination may be made whether a rate of transmission over the auxiliary communication path is acceptable for the specific subsystem, at 52. The method illustrated in flowchart 40 may be implemented in a computer software code that is storable on a computer readable media and that is operable with a processor 60, as is disclosed in FIG. 4.

Figure 4:
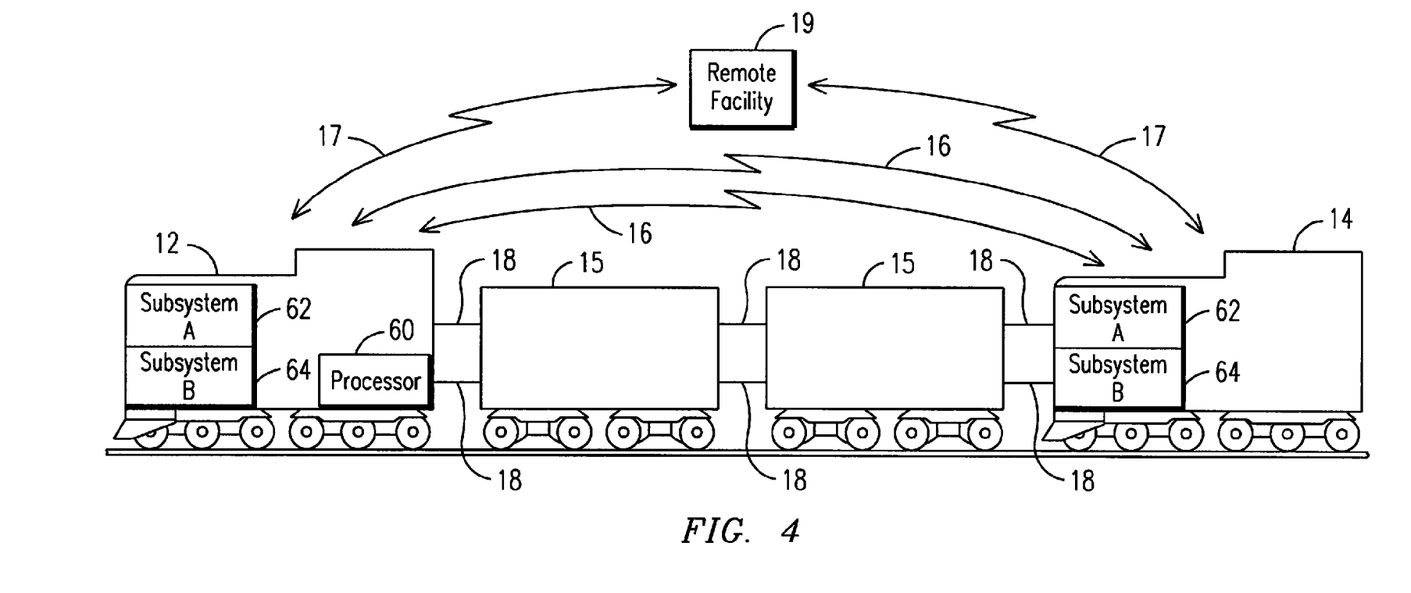
FIG. 4 depicts a block diagram of a system for ensuring communication paths exist when a primary communication path is inoperable.

FIG. 4 depicts a block diagram of a system for ensuring communication paths exist when a primary communication path is inoperable, for example on a train. A plurality of communication paths 16, 18 is available on the train. Some may be wired paths 18 while others may be wireless paths 16. To reach a remote consist 14, the wired paths 18 pass through railcars 15 separating the remote consist 12 from the next proximate consist 14. A processor 60 is aboard the train and configured to determine whether a primary communication path is operable for a specific subsystem "A" 62. The processor 60 is further configured to identify an auxiliary communication path, typically associated with another subsystem "B" 64, configure a message meant to be delivered with the primary communication path for delivery with the auxiliary communication path when the primary communication path is not operable, and/or transmit a message originally configured for the primary communication path, with the auxiliary communication path. The processor 60 is further configured to determine when the primary communication path is again operable, and to transition communication back to the primary communication path. When a plurality of auxiliary communication paths are possible, the processor 60 is further configured to determine an optimum auxiliary communication path by evaluating which of the auxiliary communication paths provide a rate of transmission acceptable for the specific subsystem, or whether the message is complaint with a bandwidth of the auxiliary communication path.

As further illustrated in FIG. 4, the auxiliary communication path may be a communication path that communicates to a remote entity, such as but not limited to a remote facility 19, a depot, and/or a wayside device. This remote communication path 17 may be in communication with a communication path on the train and/or with the specific subsystem 62, and may be used as the auxiliary communication path to relay a message from one part of the train, such as the lead locomotive consist 12 to another part of the train, such as the remote locomotive consist 14.

Examples of communication paths on a train that may be either the primary communication path or result in being used as an auxiliary communication path include, but are not limited to, a vibration based communication path, an audio communication path, an infrared communication path, a light based communication path, an ultraviolet communication path, a thermal communication path, a wireless radio frequency communication path, a Ethernet communication path, a RS232 communication path, a distributed power communication path (such as but not limited to a Locotrol® distributed power communication path), a wired electronically controlled pneumatics communication path, a wireless electronically controlled pneumatics communication path, a dynamic brake modem communication path, a Very High Frequency (VHF) communication path, an Ultra High Frequency (UHF) communication path, and an 802.11 communication path. Various operating modes may be used including, but not limited to, point to point, synchronous and asynchronous, circuit switched and cellular configurations. Those skilled in the art will recognize that the format of the message may be unique to the communication path. For example, message packets may be used when the communication path requires such a messaging format. The subsystems can use these alternate equipments and networks as a direct or relayed path for intratrain communications.

Furthermore, with respect to trains, examples of the specific subsystem, first subsystem, and second subsystem include, but are not limited to a brake control system, a head-of-train device, an end-of-train device, a distributed power device, and a vocal communication device.

As one example, with respect to a train, there may exist an electronically controlled pneumatics (ECP) network, or braking system, which is a wired network, that provides brake commands. A probable failure mode for wired ECP braking systems is a connector failure mid-train, disconnecting the rear half of the train. If this network were to fail mid-train, using an exemplary embodiment of the invention, a distributed power wireless RF network may be used to transfer information through its RF route/channel. Using the RF route, the information can be forwarded to a remote locomotive, and then to the onboard ECP equipment on the remote locomotive, which could then command the rear portion of the ECP train. In this case the remote locomotive becomes a mirror to the master node on the ECP network, and the distributed power system on the remote locomotive replicates command and control from the lead locomotive to the braking system on the rear segment of the train. A supplemental ECP power supply on the remote locomotive is enabled, and the train's ECP braking system functions as if there was no failure. This avoids operating the train in a degraded mode (such as at lower speed), or stopping and awaiting repair. This example enables a more reliable use of railcars equipped with ECP-only braking systems, rather than a more expensive dual mode system that operates with ECP or conventional air pressure reduction braking control.

Communication networks are not limited to those available onboard the train. In another exemplary embodiment, if a train network had an ECP network and a wireless ECP system, if the wired ECP system fails, the information may be routed over the ECP network to reach its final destination. If a car with an ECP network detects it has a communications loss, it could send a wireless message over the wireless ECP network that would notify other local cars about the communication loss, and the other cars could forward the messages through available networks.

If a remote controlled consist of locomotives has experienced an RF communication loss, and a path exists off board, for example a path over an 802.11 network or other wireless local area network, both the lead consist and the remote consist could connect to the 802.11 network to transition data to a wayside communications path to route the data. Those skilled in the art will recognize that railway rights-of-way devices have a plethora of other communications systems that can provide alternative paths to be used, including but not limited to, licensed and un-licensed spread spectrum networks for signaling systems and communications systems, and dedicated UHF and VHF channels allocated for railway use.

In another example, if the dynamic brake modem, which communicates braking and motoring information to a lead locomotive, is experiencing a slow communication path, and if a communications path (such as through an 802.11 network) exists amongst the locomotives within the consist that provides a higher bandwidth, the dynamic brake modem could utilize the high speed path instead of its primary communication path to transfer its information, or data.

While the invention has been described with reference to various exemplary embodiments, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, specific, etc., do not denote any order or importance, but rather the terms first, second, specific, etc., are used to distinguish one element from another.

What is claimed is:

1. A method comprising:
    determining when a first communication path ceases to be available for communication of a message used by a first subsystem of a vehicle to control one or more operations of the vehicle;
    identifying a different, second communication path of a different, second subsystem of the vehicle, the first communication path and the second communication path being different from each other in that the first communication path uses a first message format to communicate information for the first subsystem and the second communication path uses a different, second communication format to communicate information for the second subsystem;
    reformatting the message from the first format of the first communication path and the first subsystem to the second format of the second communication path and the second subsystem, wherein the first format of the first subsystem is incompatible with the second format of the second subsystem;
    transmitting the message in the second format on the second communication path; and
    transitioning back to the first communication path for communication of a subsequent message for the first subsystem when the first communication path is again available for communication of the subsequent message.

2. The method according to claim 1, further comprising determining the second communication path by evaluating which of plural auxiliary communication paths provides a transmission rate that is greater than a designated transmission rate of the second subsystem.

3. The method according to claim 1, wherein the second communication path comprises at least one of a wired path, a path that communicates using audio signals, a path that communicates using infrared signals, a path that communicates using ultraviolet signals, a path that communicates using vibrations, a path that communicates using thermal signals, or a path that communicates using visible light.

4. The method according to claim 1, wherein reformatting the message further comprises restructuring the message to be compliant with a bandwidth capacity of the second communication path.

5. A method comprising:
    determining when a first communication path ceases to be available for communication of a message used by a first subsystem of a vehicle to control one or more operations of the vehicle;
    identifying a different, second communication path of a different, second subsystem of the vehicle, the first communication path and the second communication path being different from each other in that the first communication path uses a first message format to communicate information for the first subsystem and the second communication path uses a different, second communication format to communicate information for the second subsystem;
    reformatting the message from the first format of the first communication path and the first subsystem to the second format of the second communication path and the second subsystem, wherein the first format of the first subsystem is incompatible with the second format of the second subsystem, and wherein reformatting the message further comprises removing information from the message so that the message is compliant with the second format of the second communication path; and
    transmitting the message in the second format on the second communication path.

6. A computer software code stored on a non-transitory computer readable medium and configured for execution with a processor designated for carrying out communications onboard a vehicle, the computer software code comprising one or more computer software modules configured to direct the processor to:
    determine when a first communication path ceases to be available for communication of a message used by a first subsystem of the vehicle to control one or more operations of the vehicle;
    identify a different, second communication path of a different, second subsystem of the vehicle, the first communication path and the second communication path being different from each other in that the first communication path uses a first message format to communicate information for the first subsystem and the second communication path uses a different, second communication format to communicate information for the second subsystem;
    reformat the message from the first format of the first communication path and the first subsystem to the second format of the second communication path and the second subsystem, wherein the first format of the first subsystem is incompatible with the second format of the second subsystem;
    transmit the message in the second format on the second communication path; and
    transition back to the first communication path for communication of a subsequent message for the first subsystem when the first communication path is again available for communication of the subsequent message.

7. The computer software code according to claim 6, wherein the one or more computer software modules are configured to direct the processor to determine the second communication path by evaluating which of plural auxiliary communication paths provides a transmission rate that is greater than a designated transmission rate of the second subsystem.

8. A communication system comprising:
    a first communication path utilized by a first subsystem of a vehicle to communicate a message to control one or more operations of the vehicle;
    a different, second communication path utilized by a different, second subsystem of the vehicle, the first communication path and the second communication path being different from each other in that the first communication path uses a first message format to communicate information for the first subsystem and the second communication path uses a different, second communication format to communicate information for the second subsystem; and a processor configured to:
  determine when the first communication path is unavailable for communication of the message for the first subsystem and to determine the second communication path for communication of the message,
  reformat the message from the first format of the first communication path and the first subsystem to the second format of the second communication path and the second subsystem, wherein the first format of the first subsystem is incompatible with the second format of the second subsystem, and
  determine when the first communication path is again available for communication of a subsequent message and to transition back to the first communication path for communication of the subsequent message.

9. The system according to claim 8, wherein the processor is further configured to determine the second communication path by evaluating which of plural auxiliary communication paths provides a transmission rate that is greater than a designated transmission rate of the second subsystem.

10. A method comprising:
  determining when a first communication path ceases to be available for communication of a message used by a first subsystem of a vehicle to control one or more operations of the vehicle;
  identifying a different, second communication path of a different, second subsystem of the vehicle, the first communication path and the second communication path being different from each other in that the first communication path uses a first message format to communicate information for the first subsystem and the second communication path uses a different, second communication format to communicate information for the second subsystem;
  reformatting the message from the first format of the first communication path and the first subsystem to the second format of the second communication path and the second subsystem, wherein the first format of the first subsystem is incompatible with the second format of the second subsystem; and
  transmitting the message in the second format on the second communication path, wherein the first subsystem is different from the second subsystem in that the first subsystem and the second subsystem perform different operations for control of the vehicle.

11. A method comprising:
  determining when a first communication path ceases to be available for communication of a message used by a first subsystem of a vehicle to control one or more operations of the vehicle;
  identifying a different, second communication path of a different, second subsystem of the vehicle, the first communication path and the second communication path being different from each other in that the first communication path uses a first message format to communicate information for the first subsystem and the second communication path uses a different, second communication format to communicate information for the second subsystem;
  reformatting the message from the first format of the first communication path and the first subsystem to the second format of the second communication path and the second subsystem, wherein the first format of the first subsystem is incompatible with the second format of the second subsystem; and transmitting the message in the second format on the second communication path; and
  transmitting the message in the second format on the second communication path, wherein reformatting the message includes reducing a size of the message.

12. A method comprising:
  determining when a first communication path ceases to be available for communication of a message used by a first subsystem of a vehicle to control one or more operations of the vehicle;
  identifying a different, second communication path of a different, second subsystem of the vehicle, the first communication path and the second communication path being different from each other in that the first communication path uses a first message format to communicate information for the first subsystem and the second communication path uses a different, second communication format to communicate information for the second subsystem;
  reformatting the message from the first format of the first communication path and the first subsystem to the second format of the second communication path and the second subsystem, wherein reformatting the message includes removing designated information from the message that is used by the first subsystem to perform the operations for control of the vehicle but is not used by the second subsystem to perform the operations for control of the vehicle, and wherein the first format of the first subsystem is incompatible with the second format of the second subsystem; and
  transmitting the message in the second format on the second communication path.

13. A computer software code stored on a non-transitory computer readable medium and configured for execution with a processor designated for carrying out communications onboard a vehicle, the computer software code comprising one or more computer software modules configured to direct the processor to:
  determine when a first communication path ceases to be available for communication of a message used by a first subsystem of the vehicle to control one or more operations of the vehicle;
  identify a different, second communication path of a different, second subsystem of the vehicle, the first communication path and the second communication path being different from each other in that the first communication path uses a first message format to communicate information for the first subsystem and the second communication path uses a different, second communication format to communicate information for the second subsystem, wherein the first subsystem is different from the second subsystem in that the first subsystem and the second subsystem perform different operations for control of the vehicle;
  reformat the message from the first format of the first communication path and the first subsystem to the second format of the second communication path and the second subsystem, wherein the first format of the first subsystem is incompatible with the second format of the second subsystem; and
  transmit the message in the second format on the second communication path.

14. A computer software code stored on a non-transitory computer readable medium and configured for execution with a processor designated for carrying out communications onboard a vehicle, the computer software code comprising one or more computer software modules configured to direct the processor to:

determine when a first communication path ceases to be available for communication of a message used by a first subsystem of the vehicle to control one or more operations of the vehicle;

identify a different, second communication path of a different, second subsystem of the vehicle, the first communication path and the second communication path being different from each other in that the first communication path uses a first message format to communicate information for the first subsystem and the second communication path uses a different, second communication format to communicate information for the second subsystem;

reformat the message from the first format of the first communication path and the first subsystem to the second format of the second communication path and the second subsystem, wherein the first format of the first subsystem is incompatible with the second format of the second subsystem;

transmit the message in the second format on the second communication path; and remove information from the message so that the message is compliant with the second format of the second communication path.

15. A computer software code stored on a non-transitory computer readable medium and configured for execution with a processor designated for carrying out communications onboard a vehicle, the computer software code comprising one or more computer software modules configured to direct the processor to:

determine when a first communication path ceases to be available for communication of a message used by a first subsystem of the vehicle to control one or more operations of the vehicle;

identify a different, second communication path of a different, second subsystem of the vehicle, the first communication path and the second communication path being different from each other in that the first communication path uses a first message format to communicate information for the first subsystem and the second communication path uses a different, second communication format to communicate information for the second subsystem;

reformat the message from the first format of the first communication path and the first subsystem to the second format of the second communication path and the second subsystem, wherein the first format of the first subsystem is incompatible with the second format of the second subsystem;

transmit the message in the second format on the second communication path; and direct the processor to reformat the message by reducing a size of the message.

16. A computer software code stored on a non-transitory computer readable medium and configured for execution with a processor designated for carrying out communications onboard a vehicle, the computer software code comprising one or more computer software modules configured to direct the processor to:

determine when a first communication path ceases to be available for communication of a message used by a first subsystem of the vehicle to control one or more operations of the vehicle;

identify a different, second communication path of a different, second subsystem of the vehicle, the first communication path and the second communication path being different from each other in that the first communication path uses a first message format to communicate information for the first subsystem and the second communication path uses a different, second communication format to communicate information for the second subsystem;

reformat the message from the first format of the first communication path and the first subsystem to the second format of the second communication path and the second subsystem, wherein the first format of the first subsystem is incompatible with the second format of the second subsystem;

transmit the message in the second format on the second communication path; and reformat the message by removing designated information from the message that is used by the first subsystem to perform the operations for control of the vehicle but is not used by the second subsystem to perform the operations for control of the vehicle.

17. A communication system comprising:

a first communication path utilized by a first subsystem of a vehicle to communicate a message to control one or more operations of the vehicle;

a different, second communication path utilized by a different, second subsystem of the vehicle, the first communication path and the second communication path being different from each other in that the first communication path uses a first message format to communicate information for the first subsystem and the second communication path uses a different, second communication format to communicate information for the second subsystem, wherein the first subsystem is different from the second subsystem in that the first subsystem and the second subsystem perform different operations for control of the vehicle; and a processor configured to determine when the first communication path is unavailable for communication of the message for the first subsystem and to determine the second communication path for communication of the message;

wherein the processor is further configured to reformat the message from the first format of the first communication path and the first subsystem to the second format of the second communication path and the second subsystem, wherein the first format of the first subsystem is incompatible with the second format of the second subsystem.

18. A communication system comprising:

a first communication path utilized by a first subsystem of a vehicle to communicate a message to control one or more operations of the vehicle;

a different, second communication path utilized by a different, second subsystem of the vehicle, the first communication path and the second communication path being different from each other in that the first communication path uses a first message format to communicate information for the first subsystem and the second communication path uses a different, second communication format to communicate information for the second subsystem; and a processor configured to:

determine when the first communication path is unavailable for communication of the message for the first subsystem and to determine the second communication path for communication of the message, reformat the message from the first format of the first communication path and the first subsystem to the second format of the second communication path and the second subsystem, wherein the first format of the first subsystem is incompatible with the second format of the second subsystem, and
remove information from the message so that the message is compliant with the second format of the second communication path.

19. A communication system comprising:
a first communication path utilized by a first subsystem of a vehicle to communicate a message to control one or more operations of the vehicle;
a different, second communication path utilized by a different, second subsystem of the vehicle, the first communication path and the second communication path being different from each other in that the first communication path uses a first message format to communicate information for the first subsystem and the second communication path uses a different, second communication format to communicate information for the second subsystem; and
a processor configured to:
determine when the first communication path is unavailable for communication of the message for the first subsystem and to determine the second communication path for communication of the message;
reformat the message from the first format of the first communication path and the first subsystem to the second format of the second communication path and the second subsystem, wherein the first format of the first subsystem is incompatible with the second format of the second subsystem; and
reformat the message by reducing a size of the message.

20. A communication system comprising:
a first communication path utilized by a first subsystem of a vehicle to communicate a message to control one or more operations of the vehicle;
a different, second communication path utilized by a different, second subsystem of the vehicle, the first communication path and the second communication path being different from each other in that the first communication path uses a first message format to communicate information for the first subsystem and the second communication path uses a different, second communication format to communicate information for the second subsystem; and
a processor configured to
determine when the first communication path is unavailable for communication of the message for the first subsystem and to determine the second communication path for communication of the message;
reformat the message from the first format of the first communication path and the first subsystem to the second format of the second communication path and the second subsystem, wherein the first format of the first subsystem is incompatible with the second format of the second subsystem; and
reformat the message by removing designated information from the message that is used by the first subsystem to perform the operations for control of the vehicle but is not used by the second subsystem to perform the operations for control of the vehicle.

* * * * *